(12) United States Patent
Wu et al.

(10) Patent No.: US 7,002,100 B2
(45) Date of Patent: Feb. 21, 2006

(54) LASER ASSISTED MACHINING METHOD AND DEVICE

(75) Inventors: Jinn-Fa Wu, Taichung (TW); Yeou-Bin Guu, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 100 days.

(21) Appl. No.: 10/717,945

(22) Filed: Nov. 19, 2003

(65) Prior Publication Data

US 2004/0104207 A1    Jun. 3, 2004

(30) Foreign Application Priority Data

Nov. 28, 2002   (TW) ................................ 91134563 A

(51) Int. Cl.
*B23K 26/00* (2006.01)
*B23K 26/14* (2006.01)
*B23K 26/16* (2006.01)
*B23K 26/18* (2006.01)

(52) U.S. Cl. ........................... 219/121.69; 219/121.67; 219/121.83; 219/121.84

(58) Field of Classification Search ........... 219/121.69, 219/121.67, 121.68, 121.83, 121.84, 121.85, 219/121.6; 409/132, 137, 216
See application file for complete search history.

(56) References Cited

U.S. PATENT DOCUMENTS

| | | | | |
|---|---|---|---|---|
| 5,413,439 | A * | 5/1995 | Wu et al. .................... | 409/216 |
| 5,906,459 | A * | 5/1999 | Thomas et al. ............. | 409/132 |
| 6,196,775 | B1 * | 3/2001 | Aubin et al. ................ | 409/137 |
| 6,593,541 | B1 * | 7/2003 | Herren ................... | 219/121.67 |

* cited by examiner

*Primary Examiner*—M. Alexandra Elve
(74) *Attorney, Agent, or Firm*—W. Wayne Liauh

(57) ABSTRACT

A laser assisted machining method and device comprise a tool mount on which a laser head is disposed. A digital thermometer is disposed in a machining tool or on the tool mount for feeding data to a system controller. A laser is used to enable the blade of the machining tool to heat and soften a workpiece instantaneously. As the machining process is in progress, the chip is rapidly removed. The temperature of the tool tip is monitored by the digital thermometer for automatic control of the temperature of heating the workpiece by the laser, thereby keeping the temperature of the tool tip in a specific allowable range. The efficiency of the machining process and the surface precision are thus enhanced.

7 Claims, 10 Drawing Sheets

LASER ASSISTED MACHINING METHOD AND DEVICE

FIELD OF THE INVENTION

The present invention relates generally to a high speed precision machining process, and more particularly to a laser assisted method and a laser assisted device, which are designed to alleviate the tool wear, to enhance the removal rate of the machining chip and the surface precision of work piece, and to prolong the service life span of the tool.

BACKGROUND OF THE INVENTION

Certain materials, such as ceramics, glass, nickel superalloy, etc., can not be easily machined. The machining of such materials often results in tool wear in addition to poor surface precision of the work piece. For example, the machining of the ceramic material takes various forms, such as grinding, ultrasonic machining, laser machining, discharge machining, ion beam machining, etc. These various forms of the ceramics machining have their own advantages and disadvantages; nevertheless, they have one thing in common in poor removal rate of chip. If the machining of a ceramic material is done by grinding, the grinding cost takes up to 70%–80% of the total cost of the production of the ceramic element. In another words, the grinding of the ceramic material is not only time-consuming but also costly. In view of the fact that the ceramic material, the metal material, and the plastic material are widely used to make the high-tech products, and that the ceramic material has excellent physical properties in terms of heat resistance, corrosion resistance, and hardness, the ceramic material is an indispensable element in the development of the high-tech products. For this reason, it is imperative that the efficiency of the current machining technology must be enhanced.

As illustrated in FIG. 1, a laser assisted machining (LAM) of the prior art is used to machine a ceramic workpiece in such a way that the ceramic workpiece is continuously subjected to heat by laser so as to soften the ceramic workpiece. Accordingly, a machining tool is also subjected to a very high temperature when it comes in contact with the workpiece. In addition, the softened workpiece is vulnerable to tiny thermal crack, temper deterioration, and weakness in strength in the course of the machining process. In light of the large-scale nature of the laser heating process, the physical properties of the workpiece are susceptible to variation in a large-scale pattern. For example, when a CBN (boron nitride) tool is subjected to a temperature in excess of 1470 degrees in Celsius, the crystalline structure of the boron nitride changes from cubic form to hexagonal form, thereby resulting in a substantial weakness in strength of the CBN tool. In another words, the machining efficiency of the tool is enhanced under the circumstances that the temperature of the workpiece remains at 1410 degrees in Celsius. In case of the workpiece temperature at 1570° C., the strength of the tool is greatly weakened. The continuous heating process of laser tends to undermine the longevity of the machining tool.

SUMMARY OF THE INVENTION

The primary objective of the present invention is to provide a laser assisted machining method which is devised to overcome the deficiencies of the prior art methods described above. The method of the present invention involves the use of a laser, by which a workpiece is heated locally. As the workpiece is properly softened, a machining tool is advanced to shape and finish the workpiece. In another words, the machining tool is advanced to work on a portion which is heated. The emphasis of the method of the present invention is placed on the fact that the machining process takes place at a microlocality of the workpiece as soon as the microlocality is heated by the laser. Such a method of heating the workpiece in a microscopically local manner averts the cumulative effect of heat on the workpiece, thereby minimizing the risk of variation of physical properties of the workpiece. In addition, the efficiency of the machining process is greatly enhanced.

It is another objective of the present invention to provide a laser assisted machining device comprising a tool mount which is provided with a laser head capable of focusing the laser beam on a workpiece. The tool mount is further provided with a chip spray which is intended to prevent the chip from obstructing the laser beam. The device of the present invention is designed to work in conjunction with the method of the present invention described above.

It is still another objective of the present invention to provide a laser assisted machining device comprising a digital thermometer which is disposed in a tool handle or tool mount. The digital thermometer is used to monitor the temperature of the tool tip in such a way that the data are transmitted to a system controller, by which an automatic adjustment is made on the basis of laser parameters. As a result, the heating temperature of the laser is instantly modified to alleviate the effect of frictional heat on the machining tool. The temperature of the tool tip at work can be therefore confined to a specific allowable range, thereby prolonging the service life span of the machining tool.

The features and the advantages of the present invention will be more readily understood upon a thoughtful deliberation of the following detailed description of the preferred embodiments of the present invention with reference to the accompanying drawings.

DETAILED DESCRIPTION OF THE PREFERRED EMBODIMENTS

The laser assisted machining method embodied in the present invention includes a fine machining process and an ultrafine machining process, which are described hereinafter with reference to FIGS. 2–10.

Figure 1:
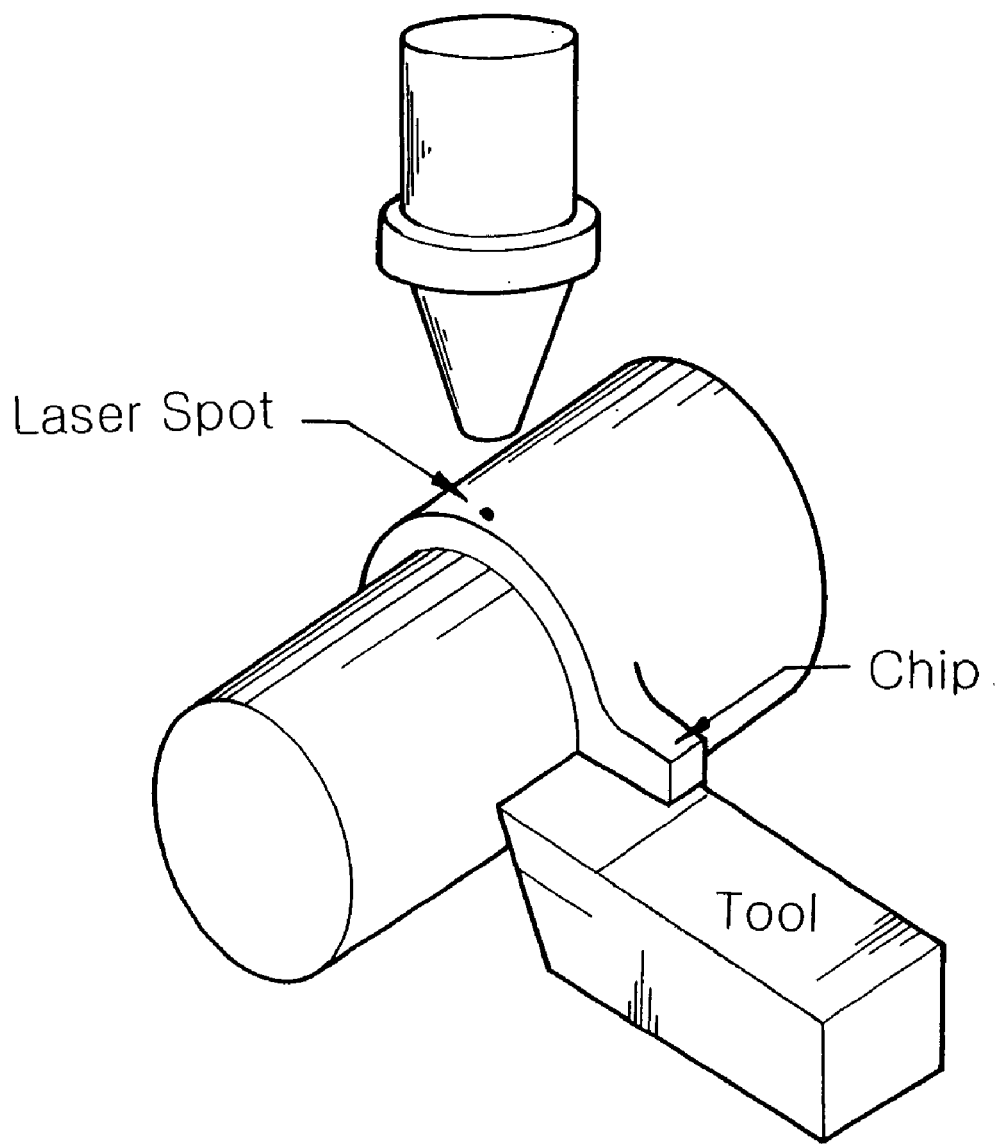
FIG. 1 shows a schematic view of a laser assisted machining method of the prior art.
Figure 2:
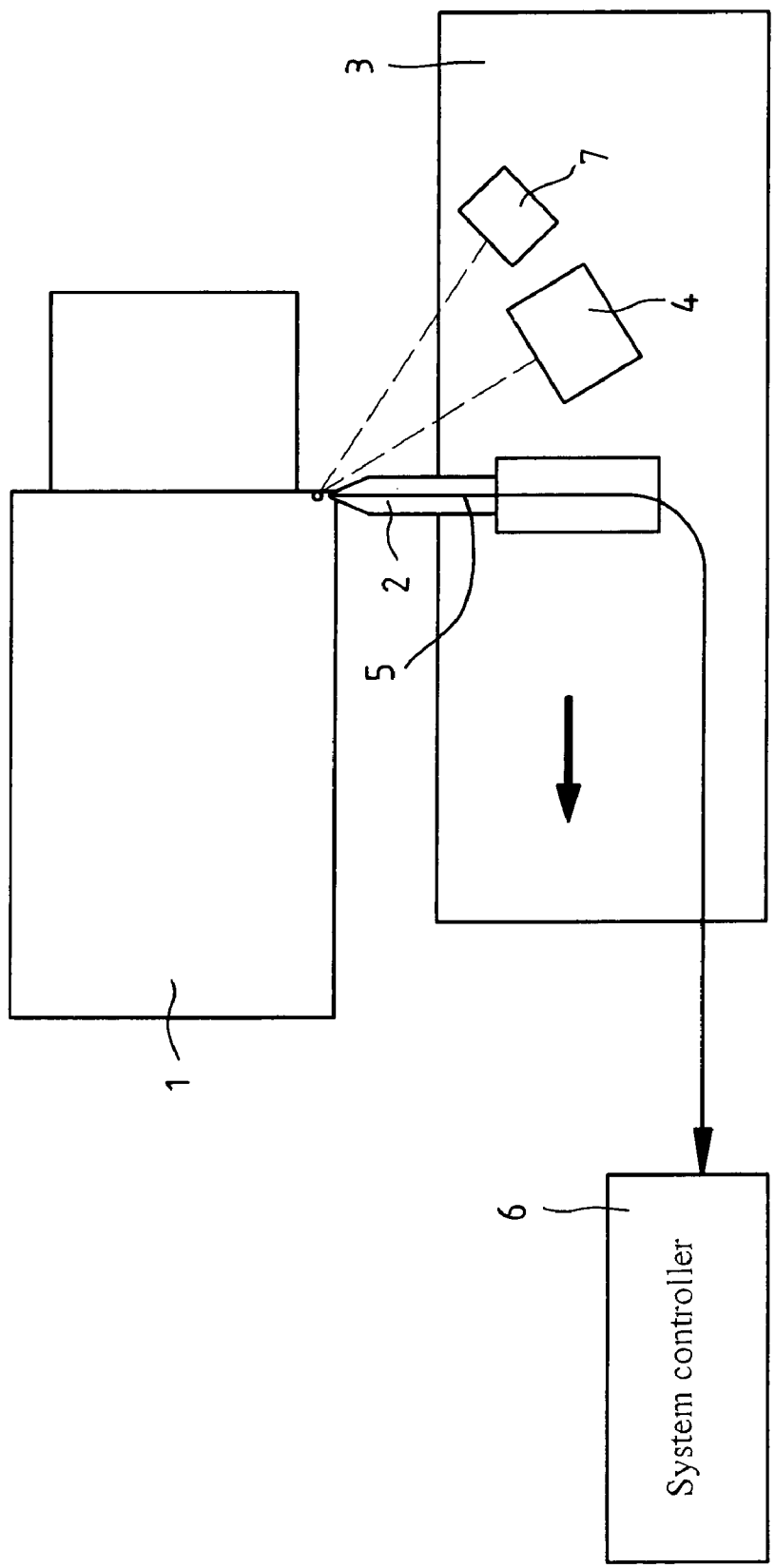
FIG. 2 shows a schematic view of a pulse laser assisted fine machining device of the present invention.
Figure 3:
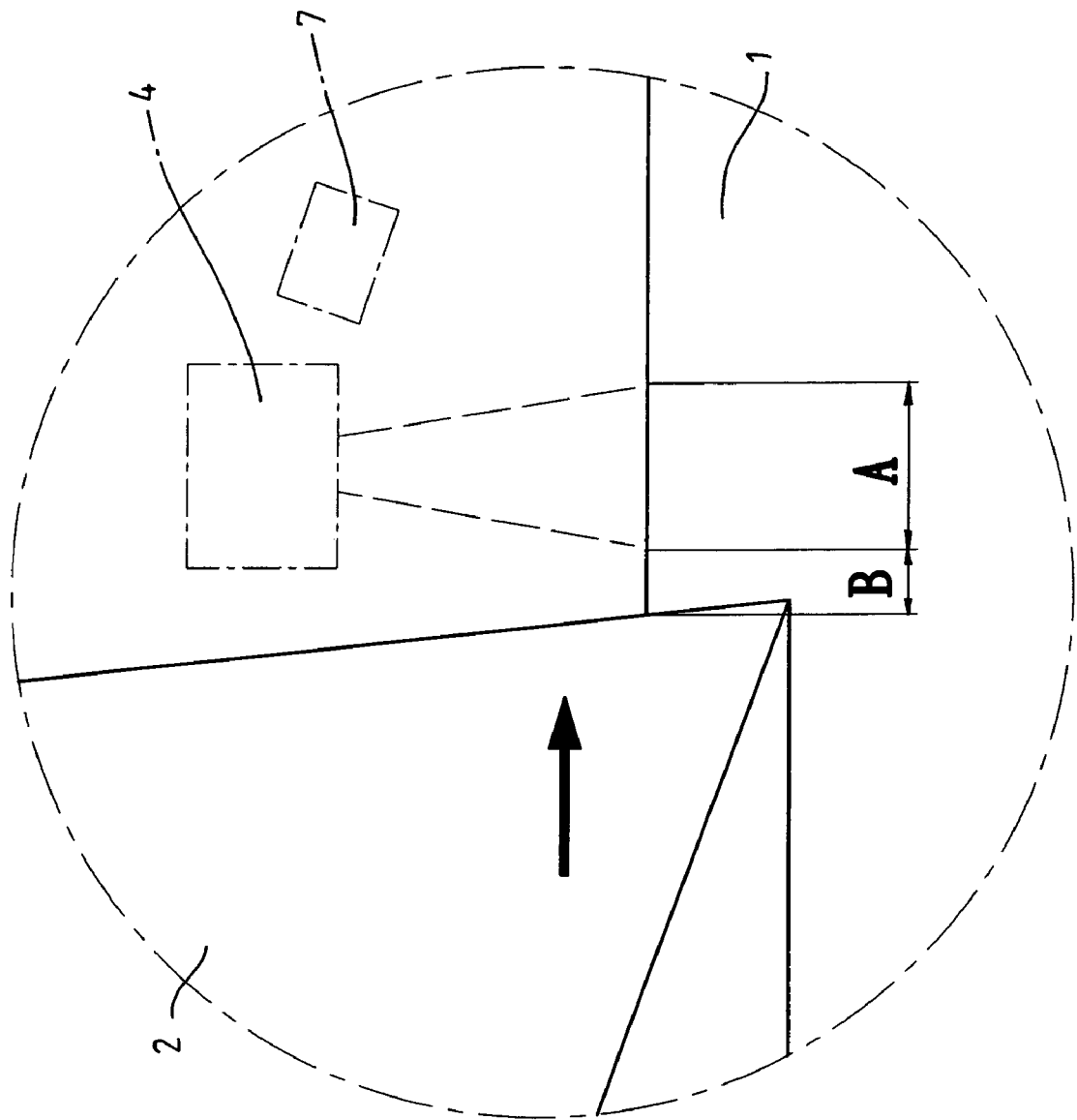
FIG. 3 shows a schematic view of the layout of the laser head and the tool of the fine machining device of the present invention.

As illustrated in FIGS. 2 and 3, the method of the present invention involves the use of a pulse laser, by which a workpiece is heated intermittently and locally, the fine machining process of the present invention involves a workpiece 1, which is held by the chuck of a machinery, such as lathe, milling machine, etc. A machining tool 2 is disposed on a tool mount 3 on which a pulse laser head 4 and a chip spray 7 are located. The laser beam is brought into focus in front of the blade of the machining tool 2 such that the focal point is separated from the blade of the machining tool 2 by a distance ranging from several μm to several mm. In another words, the focal point is separated from a heating area "A" by the distance. There is a microdistance in front of the blade, which is not exposed to the laser beam (a nonheating area B). The laser pulse time is measured in microsecond or nanosecond. The grade of the laser pulse frequency ranges from several hundred thousand Hz to several million Hz. The focal heating range is between several μm and several mm width, and between several μm and several mm length. The laser power ranges from several watts to several hundred watts. The moving speed of the workpiece 1 is the product of the laser pulse frequency and a constant interval, thereby resulting in the machining speed in excess of 10 meters per second and an enhancement in surface precision.

Figure 4:
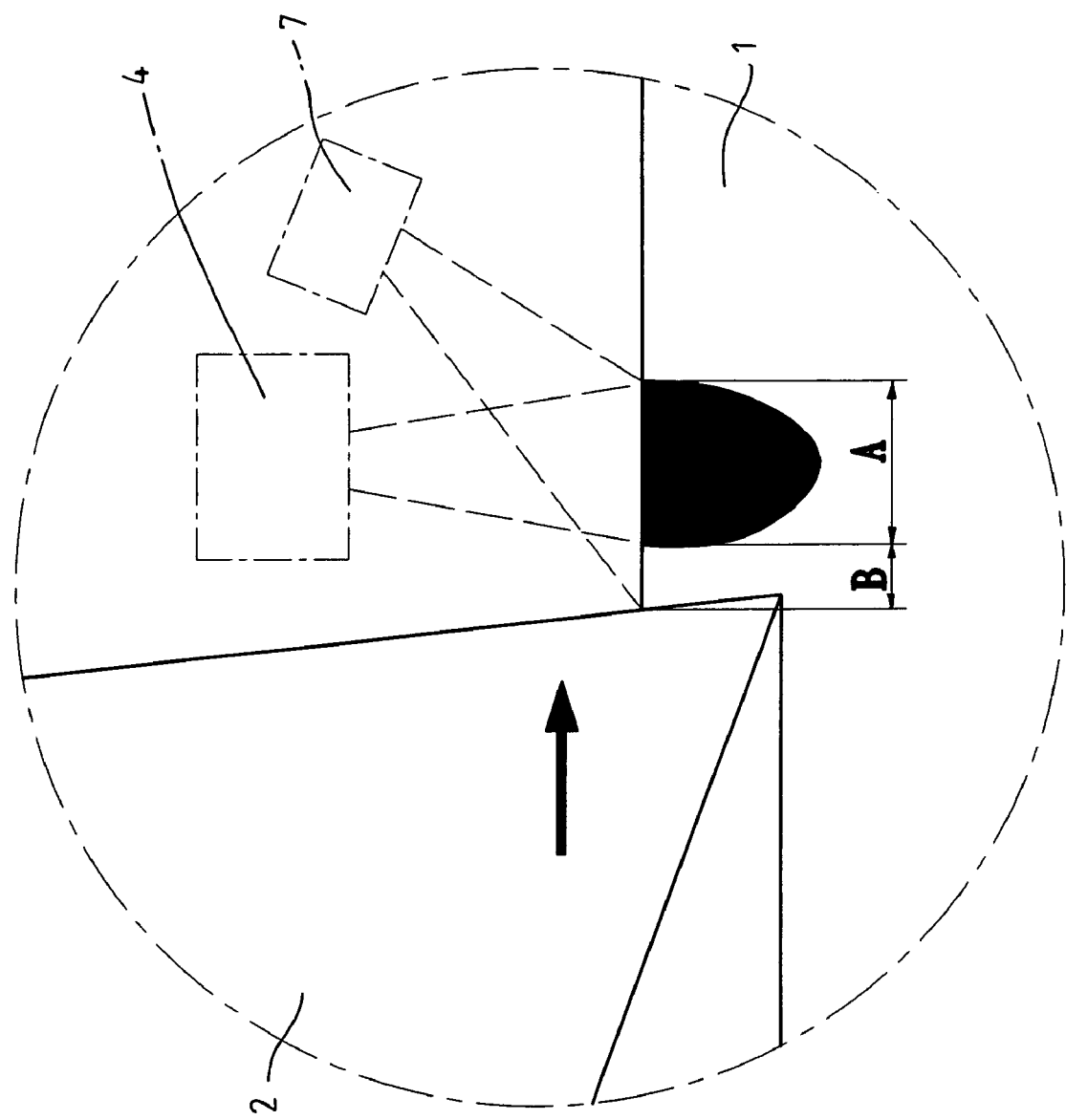
FIG. 4 shows a schematic view of the fine machining device of the present invention in action.

As shown in FIG. 4, when the workpiece 1 moves in relation to the machining tool, the pulse laser head 4 and the chip spray 7 are started. If the laser pulse frequency remains at one million Hz, the focal point of the laser beam is located at a place which is separated from the tool blade by a microdistance of 30 μm. In view of the fact that the heating area "A" is not located at the tool blade, and that the heating area is located at a microarea which is separated from the tool blade by a microdistance. As a result, the workpiece (nonheating area B) between the tool blade and the heating area A becomes a heat partition. The laser heat can not be directly transmitted to the tool blade. As a result, the temperature of the machining tool 2 does not rise along with the laser heating of the workpiece. In light of the temperature of the machining tool 2 remaining at a low level, the hardness and the strength of the machining tool 2 are not affected, thereby alleviating the wear of the machining tool 2. The chip is removed by a high-pressure fluid emission of the chip spray 7, so as to prevent the laser beam from being blocked by the chip.

Figure 5:
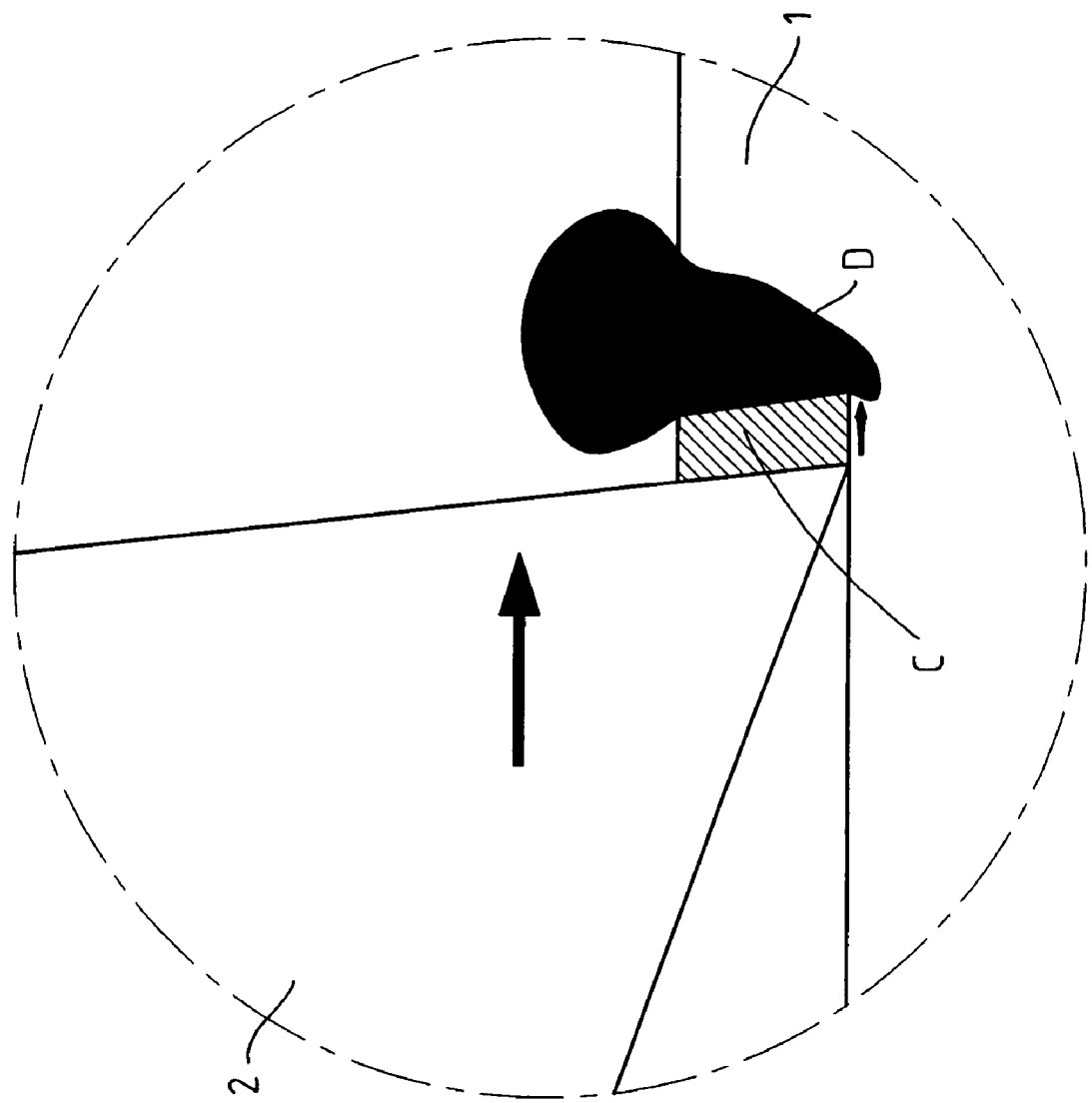
FIG. 5 shows another schematic view of the fine machining device of the present invention in action.
Figure 6:
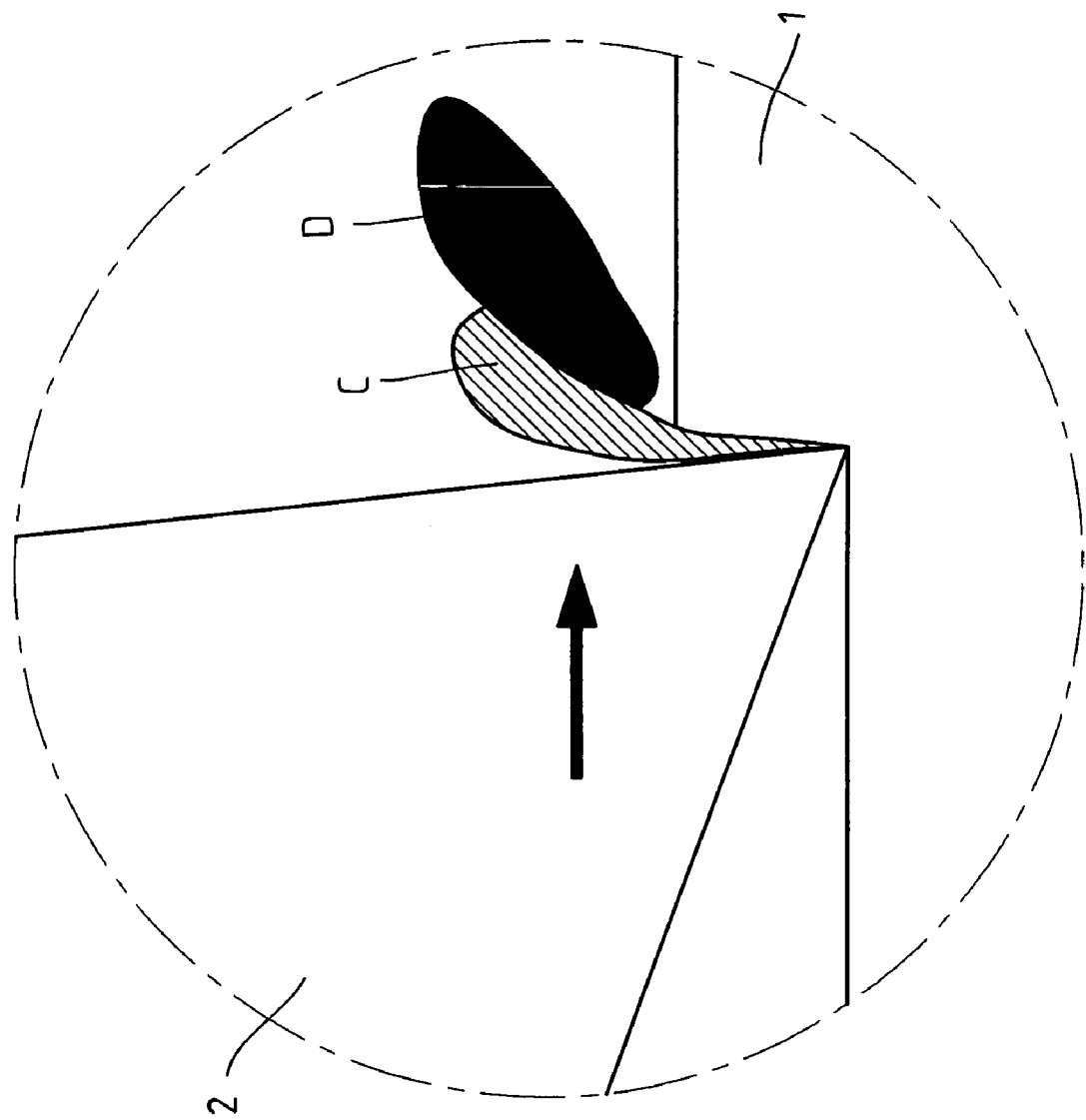
FIG. 6 shows still another schematic view of the fine machining device of the present invention in action.

As illustrated in FIGS. 5 and 6, the machining tool 2 is advanced at a machining linear speed of 30 m/sec such that the machining tool 2 cut into the workpiece 1 by a microdepth of 20 μm, which is a machining depth, with the machining width being 100 μm. The material C in front of the tool blade is machined and severed. The material D in the rear of the material C is softened by the laser beam heating to result in reduction in support strength. The material C is devoid of the support of the rear to result in reduction in machining resistance. The machining speed of the machining tool 2 is therefore accelerated. The material C is caused to displace to push the softened area, so as to force out the material D which is instantaneously softened. Thereafter, the machining tool 2 is continuously advanced to remove the machining material C and the instantaneously softened material D.

According to the present invention, the material which is located in front of the blade of the machining tool 2 by a microdistance is first softened instantaneously by the pulse laser heat prior to the machining action of the tool 2. The machining mechanism is repeated each time when the emission of the pulse laser takes place. As illustrated in FIG. 2, in order to monitor the rising temperature of the tool 2, the present invention is provided with a thermocouple or infrared digital thermometer 5, which is mounted in the tool handle or on the tool mount. As a result, the on-line monitor of the temperature of the tool tip is made possible such that the data are transmitted to a system controller 6, which is capable of an automatic control by virtue of such parameters as laser pulse width, laser pulse frequency, laser pulse number, etc. Accordingly, the temperature of heating the material by the pulse laser can be monitored and modified so as to keep the temperature of the tool tip in a specific allowable range (not in excess of 1470° C.). In addition, the workpiece and the machining tool are kept in a good machining state. The service life span of the tool is thus prolonged.

Figure 7:
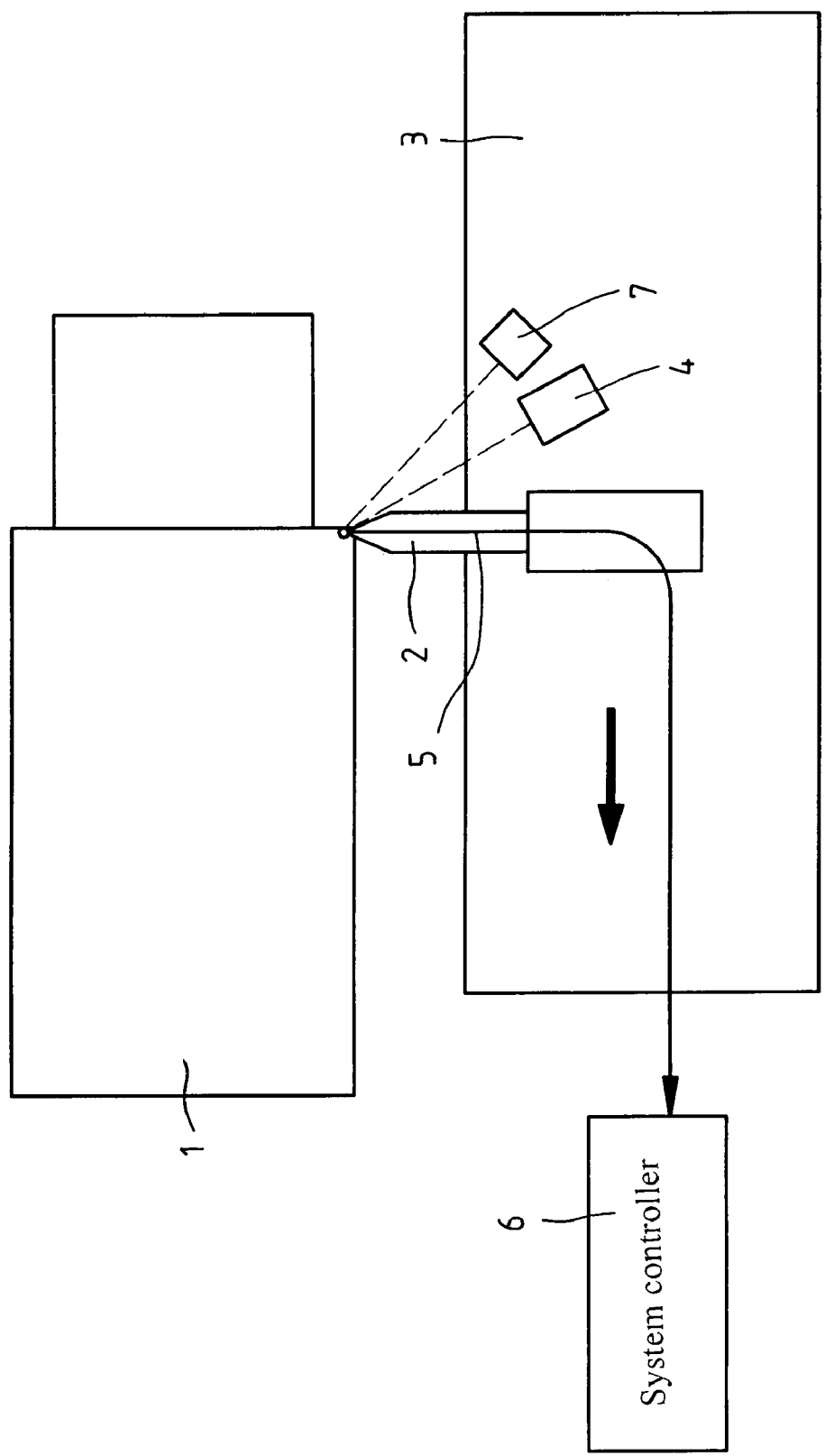
FIG. 7 shows a schematic view of an ultrafine machining device of the present invention.
Figure 8:
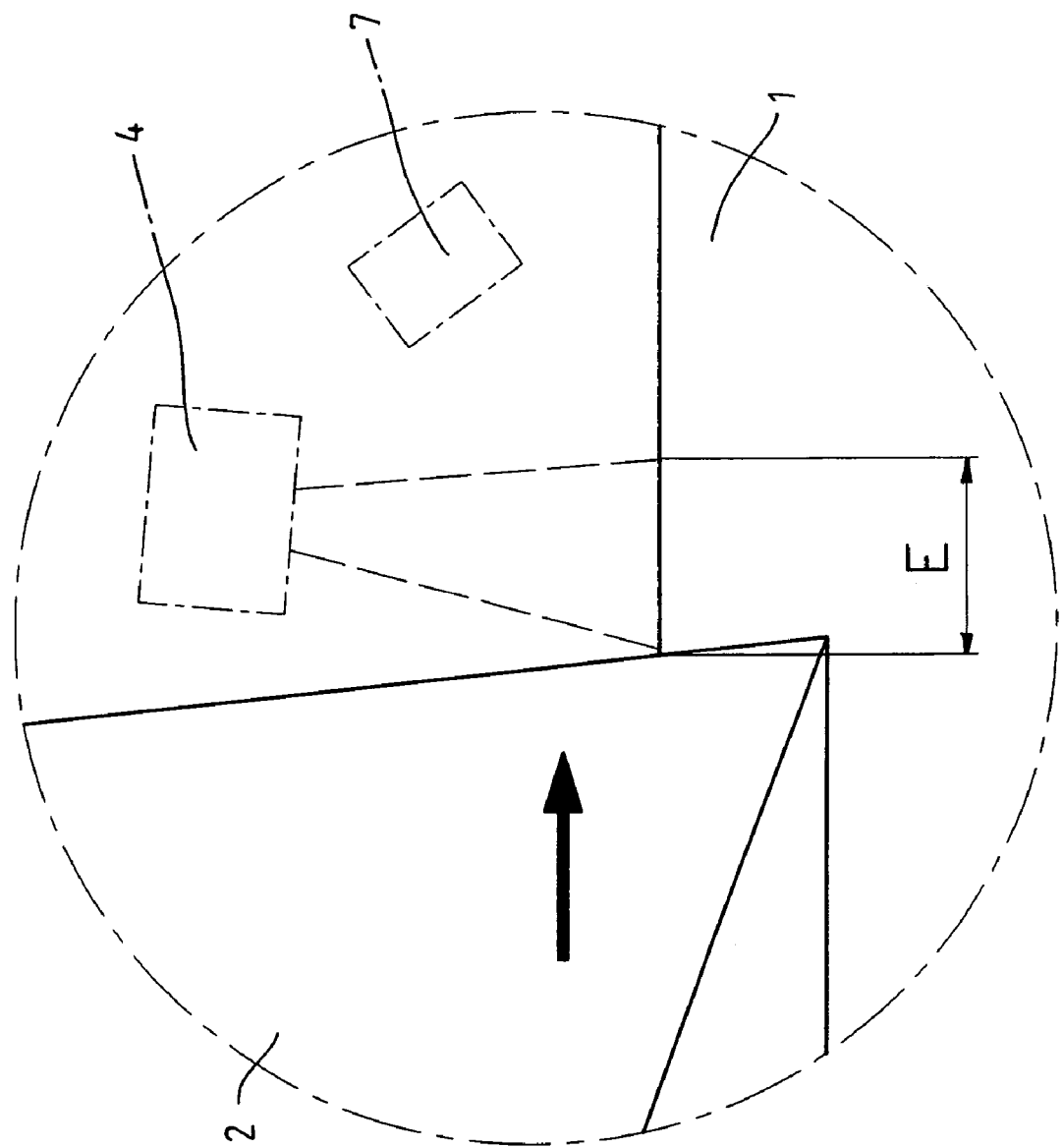
FIG. 8 shows a schematic view of the layout of the laser head and the tool of the ultrafine machining device of the present invention.

As shown in FIGS. 7 and 8, an ultrafine machining device of the present invention is by and large similar to the fine machining device described above, except that the pulsed or continuous laser beam of the ultrafine machining device is focused to enable the focal point to located right in front of the blade of the machining tool 2, thereby designating the front of the blade as a heating area E.

Figure 9:
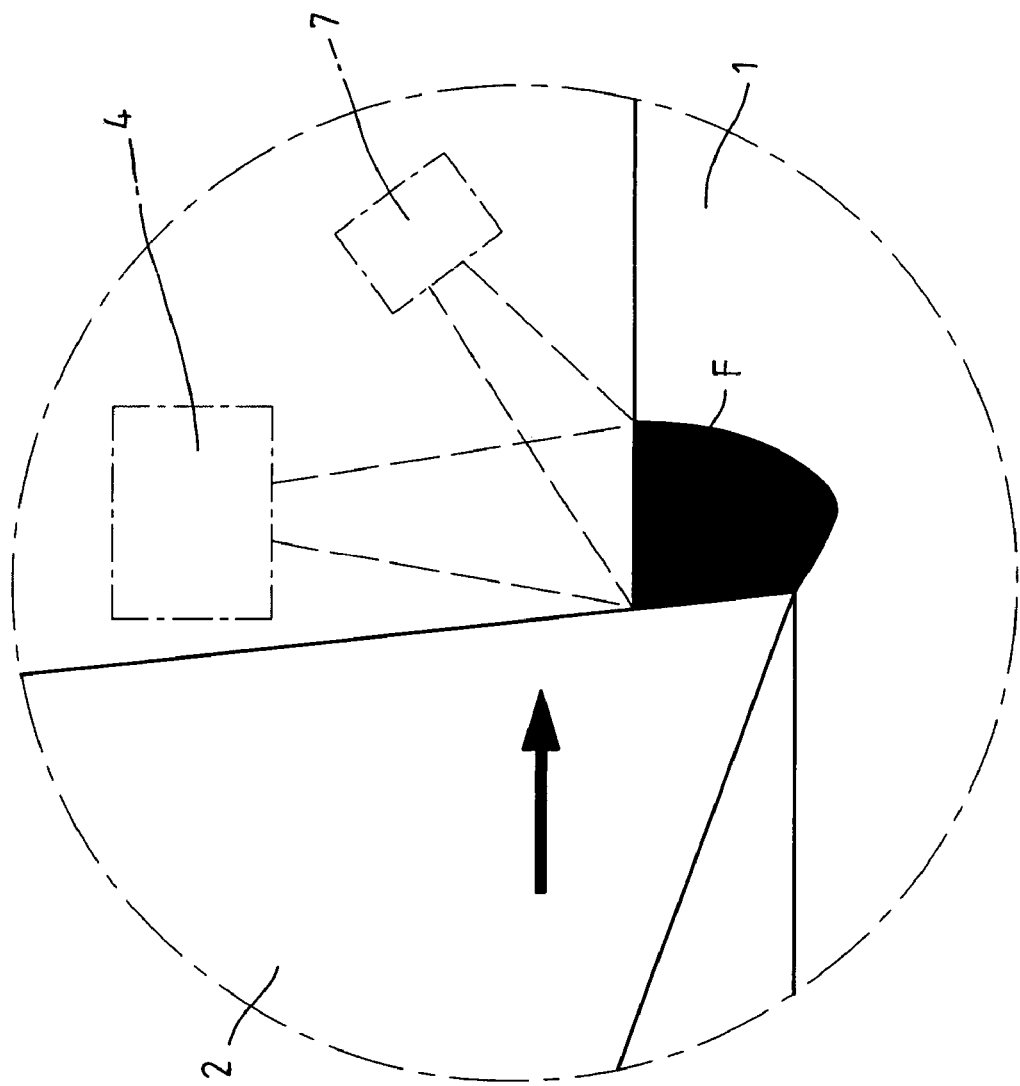
FIG. 9 shows a schematic view of the ultrafine machining device of the present invention in action.

As shown in FIG. 9, when the workpiece 1 moves in relation to the tool, the laser head 4 and the chip spray 7 are started. The laser beam is emitted at the front of the blade. The chip is removed by a high-pressure fluid emission of the chip spray 7, so as to prevent the laser beam from being blocked by the chip.

Figure 10:
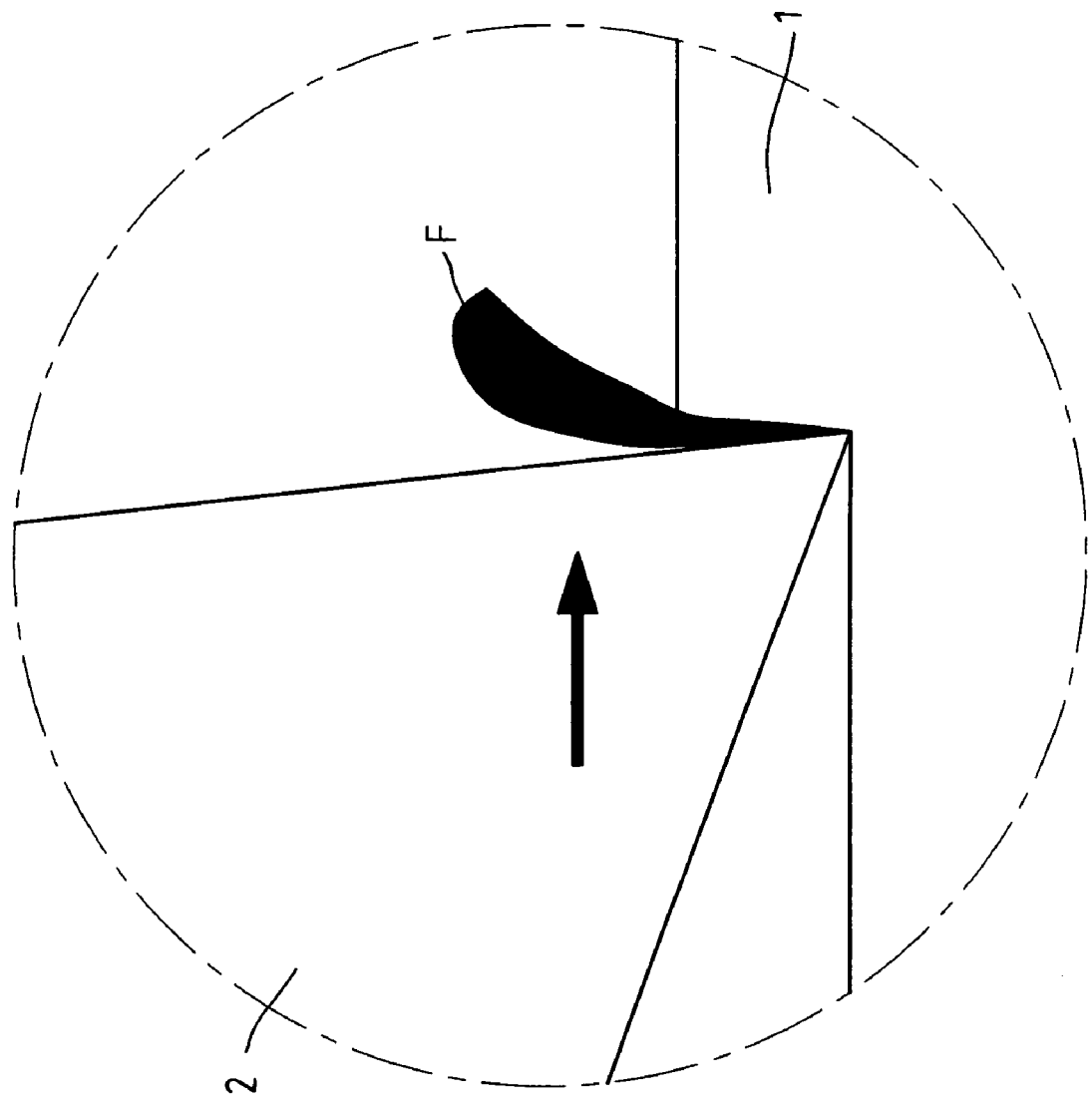
FIG. 10 shows another schematic view of the ultrafine machining device of the present invention in action.

As shown in FIG. 10, the machining tool 2 is advanced at a machining linear speed of 30 m/sec such that the machining tool 2 cuts into a ceramic workpiece 1 by a machining depth of 20 μm, with the machining width being 100 μm, thereby enabling the softened material F in front of the blade to be directly removed by machining. In light of the material F being softened instantaneously by heat, the machining resistance is greatly reduced to enhance the machining speed of the machining tool 2 as well as the machining precision of the machining tool 2.

As shown in FIGS. 7 and 9, according to the ultrafine machining of the present invention, the tool 2 comes in contact directly with the softened material F. In the course of the high-speed machining, the high temperature machining at the focal point of the laser and the frictional heat between the tool and the workpiece continue to transmit to the tool 2, thereby resulting in a progressive increase in temperature of the tool. In view of the fact that the crystalline from of the CBN (boron nitride) tool tends to change from the cubic form to the hexagonal form at a temperature in excess of 1470° C., the strength of the tool is greatly reduced. As a result, the CBN tool has a better machining effect under the circumstances that the material temperature remains at 1410° C. At a temperature of 1570° C., the tool is weakened. In order to monitor the rising temperature of the tool 2, the present invention is provided with a thermocouple or infrared digital thermometer 5, which is mounted in the tool handle or on the tool mount. As a result, the on-line monitor of the temperature of the tool tip is made possible such that the data are transmitted to a system controller 6, which is capable of an automatic control by virtue of laser parameters. Accordingly, the temperature of heating the material by the laser can be monitored and modified so as to keep the temperature of the tool tip in a specific allowable range (not in excess of 1470° C.). In addition, the workpiece and the machining tool are kept in a good machining state. The service life span of the tool is thus prolonged.

The embodiments of the present invention described above are to be regarded in all respects as being illustrative and nonrestrictive. Accordingly, the present invention may be embodied in other specific forms without deviating from the spirit thereof. The present invention is therefore to be limited only by the scopes of the following claims.

What is claimed is:

1. A pulse laser assisted machining method comprising a fine machining process, said fine machining process comprising the following steps of:
    (a) focusing a laser beam in such a manner that a focal point is located on a workpiece, and that the focal point is separated from a front of the blade of a machining tool by a microdistance;
    (b) moving the workpiece and the machining tool in relation to each other;
    (c) softening a focused area by an instantaneous laser heating;
    (d) advancing the machining tool such that the machined material and the softened material are removed together, and that the same machining mechanism is repeated until a subsequent laser emission;
wherein the laser beam is brought into focus such that the focal point is separated from the front of the blade of the machining tool by a distance ranging from several $\mu$m to more than 10 $\mu$m.

2. The method as defined in claim 1, wherein each pulse time of the laser is measured in unit of microsecond or nanosecond.

3. The method as defined in claim 1, wherein the focal heating range of the laser has a width of several $\mu$m to more than 10 $\mu$m, and a length of more than 10 $\mu$m to several hundred $\mu$m.

4. A laser assisted machining device comprising:
    a tool mount;
    a machining tool mounted on the tool mount;
    a laser head mounted on the tool mount such that the laser beam of the laser head can be focused on a workpiece for instantaneously heating and softening the workpiece;
    a chip spray mounted on the tool mount for removing chip by a high-pressure fluid emission;
    a digital thermometer disposed in a handle of the machining tool or on the tool mount for monitoring the temperature of a tool tip of the machining tool; and
    a system controller for receiving data of the tool tip temperature so as to control automatically laser.

5. The device as defined in claim 4, wherein the chip spray removes the chip by a high-pressure gas or liquid.

6. The device as defined in claim 4, wherein the laser head emits pulsed or continuous laser beam.

7. The device as defined in claim 4, wherein the digital thermometer is a thermocouple or infrared digital thermometer.

* * * * *